United States Patent
de Oliveira Filho et al.

(10) Patent No.: US 9,434,649 B2
(45) Date of Patent: Sep. 6, 2016

(54) METHOD FOR AVOIDING FUNGAL GROWTH IN MINERAL CONSTRUCTION MATERIALS

(71) Applicants: Antonio Pedro de Oliveira Filho, São Paulo (BR); Alexandra Paschoalin Menezes, São Paulo (BR); Wagner Claudio da Silva, São Paulo (BR); Denise da Silva Oliveira, Cotia (BR); Manlio Gallotti, Sao Paulo (BR); Marcia Regina S. Rios, Sao Paulo (BR)

(72) Inventors: Antonio Pedro de Oliveira Filho, São Paulo (BR); Alexandra Paschoalin Menezes, São Paulo (BR); Wagner Claudio da Silva, São Paulo (BR); Denise da Silva Oliveira, Cotia (BR); Manlio Gallotti, Sao Paulo (BR); Marcia Regina S. Rios, Sao Paulo (BR)

(73) Assignee: CLARIANT S.A., Sao Paulo (BR)

( * ) Notice: Subject to any disclaimer, the term of this patent is extended or adjusted under 35 U.S.C. 154(b) by 0 days.

(21) Appl. No.: 14/438,078

(22) PCT Filed: Sep. 4, 2013

(86) PCT No.: PCT/BR2013/000340
§ 371 (c)(1),
(2) Date: Apr. 23, 2015

(87) PCT Pub. No.: WO2014/063209
PCT Pub. Date: May 1, 2014

(65) Prior Publication Data
US 2015/0274595 A1    Oct. 1, 2015

(30) Foreign Application Priority Data
Oct. 24, 2012    (EP) .................... 12007301

(51) Int. Cl.
| | | |
|---|---|---|
| *C04B 28/30* | (2006.01) | |
| *C04B 40/00* | (2006.01) | |
| *C04B 20/10* | (2006.01) | |
| *C04B 103/67* | (2006.01) | |
| *C04B 111/00* | (2006.01) | |
| *C04B 111/70* | (2006.01) | |

(52) U.S. Cl.
CPC ........... *C04B 28/30* (2013.01); *C04B 20/1018* (2013.01); *C04B 40/0039* (2013.01); *C04B 40/0042* (2013.01); *C04B 2103/67* (2013.01); *C04B 2111/00517* (2013.01); *C04B 2111/70* (2013.01)

(58) Field of Classification Search
CPC ... C04B 14/042; C04B 14/041; C04B 14/08; C04B 14/303; C04B 14/106; C04B 14/104; C04B 20/1018; C04B 22/16; C04B 22/064; C04B 24/005; C04B 24/12; C04B 28/30; C04B 40/0039; C04B 40/0042; C04B 2103/67; C04B 2103/69; C04B 2111/00517; C04B 2111/70
See application file for complete search history.

(56) References Cited

U.S. PATENT DOCUMENTS

| | | | |
|---|---|---|---|
| 4,556,426 A | 12/1985 | Chesney, Jr. et al. | |
| 5,219,875 A | 6/1993 | Sherba et al. | |
| 5,421,867 A | 6/1995 | Yeager et al. | |
| 6,133,300 A | 10/2000 | Smith et al. | |
| 6,391,328 B1* | 5/2002 | Levy ..................... | A01N 25/10 424/405 |
| 8,083,851 B2* | 12/2011 | Crudden ................ | A01N 59/16 106/724 |
| 2005/0126430 A1 | 6/2005 | Lightner, Jr. et al. | |
| 2007/0281096 A1* | 12/2007 | Ong ....................... | A01N 43/50 427/372.2 |
| 2008/0206295 A1 | 8/2008 | Bernardini et al. | |
| 2008/0281017 A1 | 11/2008 | Weitzel et al. | |
| 2009/0104459 A1* | 4/2009 | Campbell, Jr. ........ | A01N 59/16 428/446 |
| 2011/0077278 A1 | 3/2011 | Smith et al. | |

FOREIGN PATENT DOCUMENTS

| | | |
|---|---|---|
| EP | 106562 A1 * | 4/1984 |
| JP | H08217519 | 8/1996 |
| WO | WO 99/07326 A2 * | 2/1999 |

OTHER PUBLICATIONS

Derwent-Acc-No. 2004-054486, abstract of Chinese Patent Specification No. CN 1450015 A (Oct. 2003).*
International Search Report for PCT/BR2013/000340, dated Mar. 21, 2014.
English abstract for JPH08217519, dated Aug. 27, 1996.

* cited by examiner

*Primary Examiner* — Anthony J Green
(74) *Attorney, Agent, or Firm* — Tod A. Waldrop

(57) ABSTRACT

This invention relates to a cementitious composition comprising 70-99 wt.-% of
a) an inorganic carrier for biocidally active compounds, and
b) 0.1-20 wt.-% of at least one bactericidally active compound, and
c) 0.1-25 wt.-% of at least one fungicidally active compound, and
wherein the antimicrobial composition is present in an amount of 0.01 to 10 wt.-%, based on the weight of the cementitious composition.

14 Claims, No Drawings

METHOD FOR AVOIDING FUNGAL GROWTH IN MINERAL CONSTRUCTION MATERIALS

BACKGROUND OF THE INVENTION

The present invention relates to the incorporation of a bactericide and a fungicide into building materials, more specifically into cementitious compositions such as grout, mortar, monolayer render and ceramics, in order to reduce microbial contamination by bacteria and fungi, thereby avoiding the appearance of dark spots in these materials. The cementitious compositions containing a bactericide together with a fungicide which are dispersed in an inorganic carrier material or matrix showed a significant reduction of microbial contamination even when exposed to damp environment or water.

Ceramic parts are considered one of the most washable surfaces available and are applied on the walls and floor in a wide variety of places. Currently, these parts are fixed to the ground using grout, mortar and monolayer render, whose purpose is to fill the spaces between the adjacent pieces. Usually, grouts and mortars are formulated from a mixture of Portland cement, mineral aggregates and additives. During their preparation only water is added.

In recent decades, great efforts have been made to the development of building materials with high quality and low costs. Despite the benefits and advantages of surfaces covered with ceramics, problems of contamination by micro-organisms are recurrent. They can cause chemical and physical changes producing aesthetic problems, structural degradation and fragmentation of the coating. Furthermore, the frequent cleaning of the surface can lead to a reduction in the life of such cementitious compositions. Since there are difficulties in cleaning and they are contaminated with time, they must be removed physically or mechanically, which is arduous and expensive.

Materials used in construction as grouts, mortars and monolayer render contain a large variety of organic and inorganic constituents. Several of these components can be used by micro-organisms for their growth and development, which makes these materials susceptible to microbiological contamination.

Areas that dry slowly and are always in contact with water and moisture are favorable environments (substrata) for growth of filamentous fungi. Such areas, like as walls, ceilings and floors of bathrooms, showers, swimming pools, changing rooms and food processing areas, need a coating that helps in moisture control and protection of the substratum. Paint, tile, grout and mortar are applied to the surface for protection and ensure a good appearance to the environment.

The development of micro-organisms on surfaces changes their appearance as many micro-organisms contain pigments that change the environment color. The emergence of dark spots on the surface of these materials is often characterized by the growth of filamentous fungi.

One of the problems related to the use of biocides in coatings is leaching. It has been demonstrated that many biocides can be leached when exposed to water and damp environment. The leaching process decreases the amount of biocide in the substratum, enabling the micro-organisms to grow.

These cementitious-based construction materials exhibit a high pH, but this is not sufficient to prevent micro-organisms attack, since the bacteria growing on them can promote a decrease in pH. The decrease in pH, consequently, causes a favorable environment for micro-organisms' growth. Fungi are micro-organisms that grow in relatively low pH. The decrease in pH by the bacteria makes these cement compositions more susceptible to fungal growth.

The use of fungicides in different types of construction materials is known in the art.

U.S. Pat. No. 4,556,426 relates to a Portland cement base with a halogenated aromatic dinitrile added as an active fungicidal ingredient. The resulting fungicide grout composition prolonged leach-life characteristics.

U.S. Pat. No. 5,421,867 discloses cementitious-based products, such as mortar, grout, backerboard and stucco, that are comprised of Portland cement as a common ingredient combined with optional fillers and additives with the addition of an effective antimicrobial agent.

US-2008/0281017 A1 relates to the use of biocide-containing, water-redispersible polymer powder compositions in mineral building compositions.

There are several documents that have combined antimicrobials into various industrial products.

US-2011/0077278 A1 discloses a mixture of 3-iodopropynyl-N-n-butylcarbamate (IPBC) and 2-n-N-butyl-1,2-benzisothiazolin-3-one (BBIT) for use as a fungicide and growth inhibitor in industrial applications.

US-2008/0206295 A1 teaches formulations based on 3-iodo-2-propynyl butyl carbamate (IPBC).

U.S. Pat. No. 6,133,300 discloses antimicrobial mixtures of 1,2-benzisothiazolin-3-one (BIT) and 1,3-bis (hydroxymethyl)-5-dimethylhydantoin (DMH) used to protect a substratum from attack by micro-organisms. The composition can be used broadly in industrial systems.

The IPBC (3-iodo-2-propynyl butyl carbamate) is a biocide commonly used to prevent fungus development and is highly effective against a wide variety of fungal species. IPBC can be used in various industrial applications, for example, paints, construction materials, surfactants, wood, plastics, textiles, oils, emulsions and cosmetics.

Isothiazolinones are bactericides widely used in industry to preventing bacterial growth in several applications. They are used as environmental biocides as well as preservatives for filler, pigment-systems and in-can protection.

U.S. Pat. No. 5,219,875 discloses a composition comprising 1,2-benzisothiazolin-3-one (BIT) and iodopropargyl butylcarbamate (IPBC) used for controlling microbes.

The state of the art presented above does not present any teaching about the biocide leaching problem and its prevention. The problem to be solved by the instant invention is to provide a biocide composition which is less susceptible to leaching and which may be used for cementitious compositions and cementitious-based products.

Accordingly, to overcome the shortcomings of prior art, it is an object of the subject invention to prevent bacterial and fungal infestation of cementitious compositions and cementitious-based products by using biocides deposited in inorganic matrices that make the biocides less leachable, thereby preventing the discoloration of such compositions and products.

DETAILED DESCRIPTION OF THE INVENTION

It has been found that cementitious compositions can be effectively protected against fungal and bacterial growth by adding a combined antibacterial and antifungal biocide composition which is deposited in an inorganic matrix.

The instant invention therefore provides a cementitious composition, comprising an antimicrobial composition, such antimicrobial composition comprising a) 70-99 wt.-% of an inorganic carrier for biocidally active compounds, and b) 0.1-20 wt.-% of at least one bactericidally active compound, and c) 0.1-25 wt.-% of at least one fungicidally active compound, and wherein the amount of the antimicrobial composition is between 0.01 and 10 wt.-%, based on the weight of the cementitious composition.

In a further embodiment, the instant invention provides for a process of inhibiting bacterial and fungal growth on cementitious compositions, the process comprising the step of adding to the cementitious composition the antimicrobial composition as defined above in an amount of between 0.01 and 10 wt.-% based on the weight of the cementitious composition.

In a further embodiment, the instant invention provides for the use of the antimicrobial composition as defined above in an amount of between 0.01 and 10 wt.-% based on the weight of the cementitious composition, to prevent bacteria and fungi growth on such cementitious composition.

In a preferred embodiment, the amount of inorganic carrier ("matrix") in the antimicrobial composition is between 75 and 90% by weight.

In a further preferred embodiment, the amount of bactericidally active compound in the antimicrobial composition is between 0.5 and 10%, more preferably between 1 and 5% by weight.

In a further preferred embodiment, the amount of fungicidally active compound in the antimicrobial composition is between 1 and 20, more preferably between 2 and 15% by weight.

The weight percentages pertaining to the antimicrobial composition, i.e. the composition of components a), b) and c) as defined above, are to be understood as being based on the total weight of the antimicrobial composition as 100 wt.-%.

The antimicrobial composition is added to the cementitious composition in an amount of 0.01 to 10, preferably 0.1 to 2 wt.-%. This is based on the weight of the cementitious composition as 100 wt.-%.

In a preferred embodiment, the inorganic carrier or matrix is selected from the group consisting of talcum, diatomaceous earth, bentonite, lime, kaolin, quartz, silica, sodium tripoliphosphate and alumina. Also suitable are silicate minerals such as Tectosilicates, Inosilicates, Sorosilicates, Nesosilicates or Orthosilicates. In a further preferred embodiment Phyllosilicates, such as Kaolinites or Serpentines $[Al_2Si_2O_5(OH)_4]$;

Micas such as Illite $[(K,H_3O)Al_2(Si,Al)_4O_{10}(OH)_2]$;

Vermiculite $[(Mg,Ca)_{0.4}(Mg,Fe)_3(Si,Al)_4O_{10}(OH)_2 4.5H_2O]$;

Smectite such as Montmorilonite $[Na_{0.66}(Al_{3.34}Mg_{0.66})Si_8O_{20}(OH)_4]$;

Talcum and Pyrophyllite $[Mg_6[Si_8O_{20}](OH)_4]$,

Chlorite such as Donbassite $[Al_4[Si_8O_{20}](OH)_4Al_4(OH)_{12}]$;

Poligorsquite and Sepiolite $[Mg_3Si_2O_5(OH)_4]$ are also used as inorganic carrier or matrix.

In a preferred embodiment, the bactericidally active compound is selected from the group consisting of: 1,2-benzisothiazol-3(2H)-one, 2,2-dibromo-2-cyanoacetamide, 2-bromo-2-(bromomethyl)pentane-dinitrile, 2-methyl-2-H-isothiazol-3-one, Bis(trichloromethyl) sulphone, Bronopol, Chlorocresol, Potassium (E,E)-hexa-2,4-dienoate, Silver chloride, Sodium hydrogen 2,2'methylenebis[4-chlorophenolate], Sodium p-chloro-m-cresolate and 4-Chloro-3,5-dimethylphenol.

In a preferred embodiment, the fungicidally active compound is selected from the group consisting of: (benzothiazol-2-ylthio)methyl thiocyanate, 1-(4-chlorophenyl)-4,4-dimethyl-3-(1,2,4-triazol-1-ylmethyl)pentan-3-olfTerbuconazole, 2,4-dichlorobenzyl alcohol, 2-chloroacetamide, 3-iodo-2-propylnyl butylcarbamate, Biphenyl-2-ol, Boric acid, (3a,4,7,7a-Tetrahydro-2-[trichloromethypthio]-1H-isoindole-1,3(2H)-dione), Carbendazim, Chlorothalonil, 3,5-Dimethylperhydro-1,3,5-thiadiazin-2-thion, N-(Dichlorfluormethylthio)-N',N'-dimethyl-N-phenylsulfamid, Dichloro-N-[(dimethylamino)sulphonyl]fluoro-N-(p-tolyl)methanesulphenamide/Tolylfluanid, Dichlorophen, anhydrous disodium tetraborate, Hexa-2,4-dienoic acid, N-(trichloromethylthio)phthalimide, Dinatrium-(N,N'-ethylenbis(dithiocarbamat), P-[(diiodomethyl)sulphonyl]toluene, Pyridine-2-thiol 1-oxide sodium salt, Pyrithione zinc, Sodium 2-biphenylate, Thiabendazole, Bis(dimethylthiocarbamoyl)disulfid and zinc bis(N,N-dimethyldithiocarbamat.

In a further preferred embodiment the cementitious component of the cementitious composition is selected from the group consisting of grout, mortar, monolayer render and ceramics. Monolayer render is a type of decorative mortar for walls and facades.

The antimicrobial composition of a), b) and c) may be supplied as a solid to the cementitious composition. Preferably it is supplied in powder form, or as a suspension in a suitable suspending liquid.

In one further preferred embodiment, the weight ratio between the bactericidal compound and the fungicidal compound is 1:6 to 1:2, more preferably 1:5 to 1:3.

In a further preferred embodiment, the fungicide is 3-iodo-2-propynyl butyl carbamate and the bactericide is 1,2-benzisothiazolin-3-one. These components are preferably present in a 4:1 weight ratio and homogeneously dispersed on the surface of an inert solid, preferably aluminum silicate, resulting in a powder mixture. The mixture may be made at room temperature (25° C.) by stirring 3-iodo-2-propynyl butyl carbamate and 1,2-benzisothiazolin-3-one in a mixer for several hours, e.g. for four hours.

The present invention further relates to a process for producing a biocidal composition of IPBC and BIT, preferably in a 4:1 weight ratio and homogeneously dispersed on the surface of an inert solid, preferably aluminum silicate, resulting in a powder mixture.

Specific embodiments of the invention are described in the following examples:

Example 1

In a ribbon type mixer 87.5 g of talcum were mixed with 2.5 g BIT and 10.0 g IPBC. The mixing time was 30 minutes. After this time a homogeneous white powder was discharged from the mixer and stored. The quantities of active ingredients were confirmed by liquid chromatography. This product was used to run the application assays described below.

Example 2

The following test measures the ability of the biocidal composition made according to this invention to avoid fungal growth in the surface of a cementitious composition.

Test method for resistance to growth of mold on the surface.

The evaluation of fungicidal/bactericidal activity was carried out according to the following method:

The samples were prepared using a template with 35 mm² square and 1.5 mm thickness. With a spatula, the sample was applied to template on an aluminum film. After application, the samples were dried for 30 days (period of carbonation). After 30 days, the samples were leached for 24 hours with a flow rate such that there are 2 changes of the water volume in a period of 8 hours. After 8 hours the samples were submerged for 16 hours to complete the 24 hour leaching.

To evaluate the resistance of mortars to fungal growth, we based our test on the Brazilian Technical Standard Association NBR 14941. Based on the literature, the standard method indicates some species that are frequently present on walls. Generally these micro-organisms are acquired from ATCC (American type culture collection). ATCC is a private, nonprofit biological resource center (BRC) and research organization whose mission focuses on the acquisition, authentication, production, preservation, development and distribution of standard reference microorganisms, cell lines and other materials for research in the life sciences. To perform the test, we exposed the grout to contact with fungi to evaluate the percentage of fungal growth on the grout. For that fungi are placed in a petri dish with culture medium and then are added to the grout.

According to this procedure, spore suspensions of these micro-organisms were prepared: *Aspergillus niger* ATCC 6275, *Alternaria alternata* ATCC 20084, *Cladosporium cladosporioides* ATCC16022 and a pool of wild fungi (Hyphomycetes) isolated from visibly contaminated grout in bathrooms.

Isolated fungi (wild) were used, because wild populations are exposed to environmental factors upon which natural selection can act. Studies suggest that increased environmental stress elevates evolutionary rates, increasing the expression of genetic variability. The wild micro-organisms are subjected to stresses such as temperature, availability of resources and chemical exposures. Subjected to environmental stress, they adopt strategies to survive in adverse conditions. Among such strategies that can be adopted there may be resistance against biocides. Thus, the wild micro-organisms develop survival strategies that may make them more resistant to biocides than micro-organisms cultivated in the laboratory.

Two days after the leaching, a suspension of bacteria ($10^6$ UFC/ml) isolated from contaminated grout area was inoculated on the surfce of sample with a contact time of 48 hours.

Each fungus was added separately in bottles with Sabouraud dextrose agar in order to obtain a final concentration of $10^3$ spores/ml, then the culture medium was distributed in Petri dishes. The samples were placed in the center of agar plate and incubated at 27±2° C. for 14 days. For each biocidal composition and micro-organisms, the test was done three times.

The fungal growth on the sample surface was evaluated using the following scale:

0=no growth visible
1=up to 10% growth on the surface of the specimen
2=growth between 11% and 25% on the surface of the specimen
3=growth between 26% and 50% on the surface of the specimen
4=growth between 51% and 75% on the surface of the specimen
5=more than 76% growth over the surface on the specimen

TABLE 1

Fungal growth in the surface of a grout before and after leaching

| Sample | Antimicrobial composition dosage [% w/w] | Before leaching *A. niger* ATCC 6275 | Before leaching Isolated Fungi | After Leaching *A. niger* ATCC 6275 | After Leaching Isolated Fungi |
|---|---|---|---|---|---|
| Viamão Grout | Without biocide | 0 | 2 | 0 | 2 |
| | 0.10 | 0 | 0 | 0 | 0 |
| | 0.15 | 0 | 0 | 0 | 0 |

Example 3

The following test measures the ability of the biocide composition made according to this invention to avoid fungal growth on grout. This test was carried out like the example 1 and was made against *A. niger* and the fungi (Hyphomycetes) isolated from visibly contaminated grout in bathrooms.

TABLE 2

Fungal growth in the surface of a grout before and after leaching

| Sample | Antimicrobial composition dosage [% w/w] | Before leaching *A. niger* ATCC 6275 | Before leaching Isolated Fungi | After Leaching *A. niger* ATCC 6275 | After Leaching Isolated Fungi |
|---|---|---|---|---|---|
| Belém Grout | Without biocide | 0 | 1 | 0 | 3 |
| | 0.07 | 0 | 0 | 0 | 0 |
| | 0.10 | 0 | 0 | 0 | 0 |
| | 0.15 | 0 | 0 | 0 | 0 |

Tables 1 and 2 show that leaching does nor affect the performance of the biocidal composition according to the invention at all. The performance amounts to total suppression of fungal growth even after leaching.

Example 4

The following test measures the ability of the biocide composition made according to this invention to avoid fungal growth on grout. This test was carried out like the example 1 and was made against *A. niger* and the fungi (Hyphomycetes) isolated from visibly contaminated grout in bathrooms without the leaching test.

TABLE 3

Fungal growth in the surface of a cementitious composition without leaching

| Sample | Antimicrobial composition dosage [% w/w] | *A. niger* ATCC 6275 | *A. alternata* ATCC 20084 | *C. cladosporioides* ATCC 16022 | Isolated Fungi |
|---|---|---|---|---|---|
| Cementitious composition | Without biocide | 1 | 2 | 1 | 3 |
| | 0.2 | 1 | 2 | 1 | 2 |
| | 0.3 | 1 | 1 | 1 | 2 |

Example 5

The following test measures the ability of the biocide composition made according to this invention to avoid fungal growth on mortar. This test was carried out like the example 1 and was made against *A. niger* and the fungi (Hyphomycetes) isolated from visibly contaminated grout in bathrooms without the leaching test.

TABLE 4

Fungal growth in the surface of a mortar without leaching

| Sample | Antimicrobial composition dosage [% w/w] | *A. niger* ATCC 6275 | Isolated Fungi |
|---|---|---|---|
| Mortar | Without biocide | 1 | 5 |
|  | 0.3 | 1 | 2 |
|  | 0.5 | 1 | 1 |
|  | 0.7 | 0* | 1 |
|  | 1.0 | 0* | 1 |

The invention claimed is:

1. A cementitious composition, comprising a cementitious component and an antimicrobial composition, such antimicrobial composition comprising
   a) 70-99 wt.-% of an inorganic carrier for biocidally active compounds,
   b) 0.1-20 wt.-% of at least one bactericidally active compound, selected from the group consisting of (benzothiazol-2-ylthio)methyl thiocyanate, 1-(4-chlorophenyl)-4,4-dimethyl-3-(1,2,4-triazol-1-ylmethyl)pentan-3-ol/Terbuconazole, 2,4-dichlorobenzyl alcohol, 2-chloroacetamide, 3-iodo-2-propylnyl butylcarbamate, Biphenyl-2-ol, Boric acid, 3a,4,7,7a-Tetrahydro-2-[trichloromethyl)thio]-1H-isoindole-1,3(2H)-dione), Carbendazim, Chlorothalonil,3,5-Dimethylperhydro-1,3,5-thiadiazin-2-thion, N-(Dichlorfluormethylthio)-N',N'-dimethyl-N-phenylsulfamid), Dichloro-N-[(dimethylamino)sulphonyl]fluoro-N-(p-tolyl) methanesulphenamide/Tolylfluanid, Dichlorophen, anhydrous disodium tetraborate, Hexa-2,4-dienoic acid, N-(trichloromethylthio)phthalimide, Disodium-N,N'-ethylenebis(dithiocarbamate), P-[(diiodomethyl) sulphonyl]toluene, Pyridine-2-thiol 1-oxide sodium salt, Pyrithione zinc, Sodium 2-biphenylate, Thiabendazole, Bis(dimethylthiocarbamoyl)disulfide and zinc bis (N,N-dimethyldithiocarbamate) and
   c) 0.1-25 wt.-% of at least one fungicidally active compound, selected from the group consisting of 1,2-benzisothiazol-3(2H)-one, 2,2-dibromo-2-cyanoacetamide, 2-bromo-2-(bromomethyl)pentane-dinitrile, 2-methyl-2-H-isothiazol-3-one, Bis(trichloromethyl) sulphone, Bronopol, Chlorocresol, Potassium (E,E)-hexa-2,4-dienoate, Silver chloride, Sodium hydrogen 2,2' methylenebis[4-chlorophenolate], Sodium p-chloro-m-cresolate and 4-Chloro-3,5-dimethylphenol,
   wherein the amount of the antimicrobial composition is between 0.01 and 10 wt.-%, based on the weight of the cementitious composition.

2. The cementitious composition according to claim 1, wherein the amount of inorganic carrier in the antimicrobial composition is between 75 and 90% by weight.

3. The cementitious composition according to claim 1, wherein the amount of bactericidally active compound in the antimicrobial composition is between 0.5 and 10% by weight.

4. The cementitious composition according to claim 1, wherein the amount of fungicidally active compound in the antimicrobial composition is between 1 and 20 wt.-%.

5. The cementitious composition according to claim 1, wherein the antimicrobial composition is present in an amount of between 0.1 and 2 wt.-%, based on the weight of the cementitious composition.

6. The cementitious composition according to claim 1, wherein the inorganic carrier is selected from the group consisting of talcum, diatomaceous earth, bentonite, lime, kaolin, quartz, silica, sodium tripolyphosphate and alumina.

7. The cementitious composition according to claim 1, wherein the antimicrobial composition is a solid added to the cementitious composition as a powder or a suspension in a suitable suspending liquid.

8. The cementitious composition according to claim 1, wherein the weight ratio between the bactericidally active compound and the fungicidally active compound is from 1:6 to 1:2.

9. The cementitious composition according to claim 1, wherein the cementitious component is selected from the group consisting of grout, mortar, monolayer render and ceramics.

10. The cementitious composition according to claim 1, wherein the fungicidally active compound is 3-iodo-2-propynyl butyl carbamate and the bactericidally active compound is 1,2-benzisothiazol-3(2H)-one.

11. The cementitious composition according to claim 10, wherein 3-iodo-2-propynyl butyl carbamate and 1,2-benzisothiazol-3(2H)-one are present in a 4:1 weight ratio.

12. The cementitious composition according to claim 10, wherein 3-iodo-2-propynyl butyl carbamate and 1,2-benzisothiazol-3(2H)-one are homogeneously dispersed on the surface of an inert solid and form a powder.

13. The cementitious composition according to claim 12, wherein the inert solid is aluminum silicate.

14. A process for inhibiting bacterial and fungal growth on cementitious compositions, the process comprising the step of adding to the cementitious composition an antimicrobial composition comprising
   a) 70-99 wt.-% of an inorganic carrier for biocidally active compounds, and
   b) 0.1-20 wt.-% of at least one bactericidally active compound, selected from the group consisting of (benzothiazol-2-ylthio)methyl thiocyanate, 1-(4-chlorophenyl)-4,4-dimethyl-3-(1,2,4-triazol-1-ylmethyl)pentan-3-ol/Terbuconazole, 2,4-dichlorobenzyl alcohol, 2-chloroacetamide, 3-iodo-2-propylnyl butylcarbamate, Biphenyl-2-ol, Boric acid, 3a,4,7,7a-Tetrahydro-2-[trichloromethyl)thio]-1H-isoindole-1,3(2H)-dione), Carbendazim, Chlorothalonil,3,5-Dimethylperhydro-1,3,5-thiadiazin-2-thion, N-(Dichlorfluormethylthio)-N',N'-dimethyl-N-phenylsulfamid), Dichloro-N-[(dimethylamino)sulphonyl]fluoro-N-(p-tolyl) methanesulphenamide/Tolylfluanid, Dichlorophen, anhydrous disodium tetraborate, Hexa-2,4-dienoic acid, N-(trichloromethylthio)phthalimide, Dinatrium-(N,N'-ethylenebis(dithiocarbamat), P-[(diiodomethyl) sulphonyl]toluene, Pyridine-2-thiol 1-oxide sodium salt, Pyrithione zinc, Sodium 2-biphenylate, Thiabendazole, Bis(dimethylthiocarbamoyl)disulfid and zinc bis(N,N-dimethyldithiocarbamat and c) 0.1-25 wt.-% of at least one fungicidally active compound, selected from the group consisting of 1,2-benzisothiazol-3(2H)-one, 2,2-dibromo-2-cyanoacetamide, 2-bromo-2-(bromomethyl)pentane-dinitrile, 2-methyl-2-H-isothiazol-3-one, Bis(trichloromethyl) sulphone, Bronopol, Chlorocresol, Potassium (E,E)-hexa-2,4-dienoate, Silver chloride, Sodium hydrogen 2,2'methylenebis[4-chlorophenolate], Sodium p-chloro-m-cresolate and 4-Chloro-3,5-dimethylphenol, in an amount so that the combined weight of the bactericidally active compound or compounds and of the fungicidally active compound or compounds is between 0.01 and 10 wt.-% of the cementitious composition.

* * * * *